United States Patent
Okada

(10) Patent No.: US 11,906,075 B2
(45) Date of Patent: Feb. 20, 2024

(54) SOLENOID VALVE CONTROL DEVICE

(71) Applicant: SMC CORPORATION, Tokyo (JP)

(72) Inventor: Yui Okada, Moriya (JP)

(73) Assignee: SMC CORPORATION, Tokyo (JP)

( * ) Notice: Subject to any disclaimer, the term of this patent is extended or adjusted under 35 U.S.C. 154(b) by 0 days.

(21) Appl. No.: 17/937,581

(22) Filed: Oct. 3, 2022

(65) Prior Publication Data
US 2023/0136636 A1 May 4, 2023

(30) Foreign Application Priority Data

Nov. 4, 2021 (JP) ................................ 2021-179923

(51) Int. Cl.
*F16K 31/06* (2006.01)
*F16K 37/00* (2006.01)

(52) U.S. Cl.
CPC ...... *F16K 37/0083* (2013.01); *F16K 31/0675* (2013.01)

(58) Field of Classification Search
CPC ..... Y10T 137/87885; Y10T 137/87772; F16K 31/0603; F16K 31/0675; F16K 37/0025; F16K 37/0083; F15B 13/0839; F15B 13/0867; F15B 13/085; F15B 13/0857; F15B 13/086; H04L 7/0008; H04L 12/40; H04B 2203/5429
See application file for complete search history.

(56) References Cited

U.S. PATENT DOCUMENTS

| | | | |
|---|---|---|---|
| 6,397,880 B1 * | 6/2002 | Stoll | F15B 13/0857 137/271 |
| 7,191,800 B2 * | 3/2007 | Berner | F15B 13/0875 137/553 |
| 7,198,065 B2 * | 4/2007 | Vester | F15B 20/008 137/554 |
| 7,690,398 B2 * | 4/2010 | Kuhbauch | F15B 13/085 137/884 |
| 9,004,108 B2 * | 4/2015 | Okamoto | F16K 31/06 700/282 |
| 9,488,990 B2 * | 11/2016 | Morikawa | F15B 20/008 |
| 10,006,557 B2 * | 6/2018 | De Carolis | F15B 13/0857 |
| 2005/0096756 A1 * | 5/2005 | Quast | H04B 10/801 700/20 |
| 2014/0048162 A1 | 2/2014 | Okamoto | |
| 2017/0356475 A1 * | 12/2017 | Hamm | F16K 31/0675 |
| 2018/0181522 A1 * | 6/2018 | Leo | F15B 13/0867 |

FOREIGN PATENT DOCUMENTS

JP 5641447 B2 12/2014

* cited by examiner

*Primary Examiner* — Matthew W Jellett
(74) *Attorney, Agent, or Firm* — Oblon, McClelland, Maier & Neustadt, L.L.P.

(57) ABSTRACT

A second communication circuit of each of solenoid valve modules other than a terminal solenoid valve module receives a signal from a switching line located in the next-stage solenoid valve module, and the second communication circuit of the terminal solenoid valve module that receives no signal from the switching line transmits a solenoid valve control signal and signals related to diagnostic information of the plurality of solenoid valve modules to a communication module via a receiving line.

5 Claims, 1 Drawing Sheet

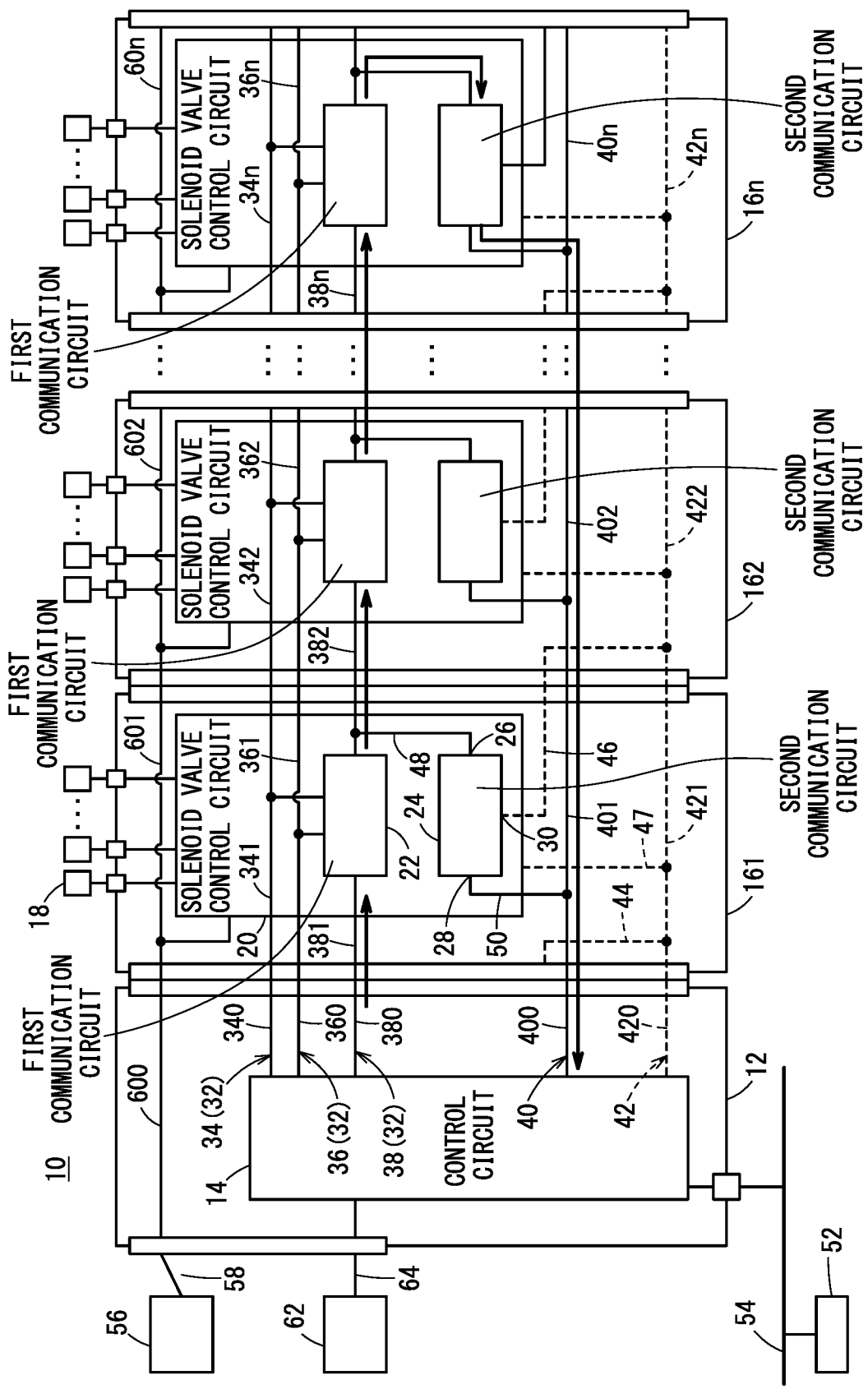

SOLENOID VALVE CONTROL DEVICE

CROSS-REFERENCE TO RELATED APPLICATIONS

This application is based upon and claims the benefit of priority from Japanese Patent Application No. 2021-179923 filed on Nov. 4, 2021, the contents of which are incorporated herein by reference.

BACKGROUND OF THE INVENTION

Field of the Invention

The present invention relates to a solenoid valve control device in which a plurality of solenoid valve modules are connected to a communication module (control module).

Description of the Related Art

Conventionally, there has been known a solenoid valve control device in which a plurality of solenoid valve modules are connected to a communication module (control module) that communicates with, for example, a PLC, and solenoid valves of the plurality of solenoid valve modules are controlled by one communication module. For example, JP 5641447 B2 discloses a solenoid valve control device in which a plurality of manifold solenoid valve blocks are connected in series to a solenoid valve control unit.

The solenoid valve control device disclosed in JP 5641447 B2 includes power supply lines, serial communication lines, and block select lines. The solenoid valve control unit of the solenoid valve control device supplies a block select signal to a solenoid valve drive circuit of a solenoid valve block to be controlled, via a predetermined block select line and a transfer wiring of the solenoid valve block.

SUMMARY OF THE INVENTION

When one communication module controls the solenoid valves of a large number of solenoid valve modules, the number of communication lines required for communication between the communication module and the solenoid valve modules may become enormous. As the number of the communication lines increases, the size of the device increases and the installation space thereby increases, and moreover, the number of processes for connecting the communication lines increases. In addition, when an operation state of the solenoid valve is diagnosed in the solenoid valve module, it is necessary for the communication module to grasp the diagnostic information, and the number of the communication lines may further increase.

In the solenoid valve control device disclosed in JP 5641447 B2, block select lines corresponding to the number of the solenoid valve blocks are required. Therefore, the number of the solenoid valve blocks connected to the solenoid valve control unit is limited.

The present invention has the object of solving the aforementioned problems.

According to the present invention, provided is a solenoid valve control device comprising a plurality of solenoid valve modules, and a communication module, the solenoid valve modules being connected in series to the communication module, the solenoid valve control device further comprising: a transmission line; a receiving line; and a switching line, wherein the transmission line, the receiving line, and the switching line cross the communication module and the plurality of solenoid valve modules, the solenoid valve modules each include a first communication circuit and a second communication circuit, an input terminal of the second communication circuit is connected to the transmission line, and an output terminal of the second communication circuit is connected to the receiving line, wherein a solenoid valve control signal transmitted from the communication module to the transmission line is received by the first communication circuit of each of the solenoid valve modules, and a signal related to diagnostic information is transmitted from the first communication circuit to the transmission line together with the solenoid valve control signal, and wherein the second communication circuit of each of the solenoid valve modules other than the solenoid valve module disposed at a terminal end of the plurality of solenoid valve modules receives a signal from the switching line located in the solenoid valve module disposed next thereto, and the second communication circuit of the solenoid valve module that is disposed at the terminal end and that receives no signal from the switching line transmits the solenoid valve control signal and signals related to the diagnostic information of the plurality of solenoid valve modules to the communication module via the receiving line.

Since the solenoid valve control device according to the present invention includes the switching line and the second communication circuit, the signals related to the diagnostic information of the plurality of solenoid valve modules are automatically transmitted from the solenoid valve module disposed at the terminal end to the communication module. As a result, the communication module can grasp the diagnostic information of the plurality of solenoid valve modules. In addition, a communication line required for feeding back the diagnostic information of the plurality of solenoid valve modules to the communication module is not particularly required. Moreover, even if the solenoid valve module disposed at the terminal end is changed by adding a solenoid valve module, the signal transmission path is automatically switched, and therefore, it is not necessary to give a special instruction to the solenoid valve module disposed at the terminal end.

The above and other objects, features, and advantages of the present invention will become more apparent from the following description when taken in conjunction with the accompanying drawings, in which a preferred embodiment of the present invention is shown by way of illustrative example.

BRIEF DESCRIPTION OF THE DRAWINGS

FIG. 1 is a circuit diagram of a solenoid valve control device according to an embodiment of the present invention.

DESCRIPTION OF THE INVENTION

As shown in FIG. 1, a solenoid valve control device 10 according to an embodiment of the present invention includes a communication module 12 and a plurality of manifold solenoid valve modules 161 to 16$n$. The plurality of solenoid valve modules 161 to 16$n$ have the same structure and are connected in series to the communication module 12. One or a plurality of solenoid valves 18 are attached to each of the solenoid valve modules 161 to the 16$n$. Each of the solenoid valve modules 161 to 16$n$ includes a solenoid valve control circuit 20 that outputs a drive signal to the solenoid valve 18 attached to the solenoid valve module.

The number of the solenoid valve modules 161 to 16n in the solenoid valve control device 10 is n, and for example, n=16. Further, the number of the solenoid valves 18 that can be attached to each of the solenoid valve modules 161 to 16n is, for example, eight at most. In this case, a maximum of 128 solenoid valves 18 can be mounted on one solenoid valve control device 10.

In the following, among the plurality of solenoid valve modules 161 to 16n, the solenoid valve module 161 located closest to the communication module 12 is referred to as a "start-end solenoid valve module". Further, the solenoid valve module 16n located farthest from the communication module 12 is referred to as a "terminal solenoid valve module". Moreover, with respect to the two adjacent solenoid valve modules, when viewed from the solenoid valve module closer to the communication module 12, the solenoid valve module farther from the communication module 12 is referred to as a "next-stage solenoid valve module". Conversely, when viewed from the solenoid valve module farther from the communication module 12, the solenoid valve module closer to the communication module 12 is referred to as a "previous-stage solenoid valve module".

The communication module 12 includes a control circuit 14 that bidirectionally communicates with a PLC 52, which is a host controller, via a bus line 54. The communication module 12 receives signals for controlling the solenoid valves 18 of the plurality of solenoid valve modules 161 to 16n from the PLC 52. A control system power supply 62 is connected to the communication module 12. Electric power necessary for the operation of the control circuit 14 is supplied from the control system power supply 62 to the control circuit 14 via a control system power line 64.

A drive system power supply 56 is connected to the communication module 12. A drive system power line 58 extending from the drive system power supply 56 crosses the communication module 12 and the plurality of solenoid valve modules 161 to 16n. The drive system power line 58 includes a divided power line 600 disposed in the communication module 12, and divided power lines 601 to 60n disposed in the respective solenoid valve modules 161 to 16n.

By the plurality of solenoid valve modules 161 to 16n being connected to the communication module 12, the divided power line 600 of the communication module 12 and the divided power lines 601 to 60n of the plurality of solenoid valve modules 161 to 16n are connected to each other. In the solenoid valve modules 161 to 16n, electric power necessary for driving the solenoid valves 18 is supplied to the solenoid valve control circuits 20 via the divided power lines 601 to 60n of the solenoid valve modules 161 to 16n, respectively.

The solenoid valve control device 10 includes a transmission line 32 extending from the control circuit 14 of the communication module 12. The transmission line 32 is a communication line through which the communication module 12 transmits signals to the plurality of solenoid valve modules 161 to 16n. The transmission line 32 includes three communication lines of first to third communication lines 34, 36, and 38. The first to third communication lines 34, 36, and 38 cross the communication module 12 and the plurality of solenoid valve modules 161 to 16n.

The first communication line 34 includes a first divided communication line 340 disposed in the communication module 12, and first divided communication lines 341 to 34n disposed in the solenoid valve modules 161 to 16n. Similarly, the second communication line 36 includes a second divided communication line 360 disposed in the communication module 12, and second divided communication lines 361 to 36n disposed in the solenoid valve modules 161 to 16n. The third communication line 38 includes a third divided communication line 380 disposed in the communication module 12, and third divided communication lines 381 to 38n disposed in the solenoid valve modules 161 to 16n.

By the plurality of solenoid valve modules 161 to 16n being connected to the communication module 12, the first divided communication line 340 of the communication module 12 and the first divided communication lines 341 to 34n of the plurality of solenoid valve modules 161 to 16n are connected to each other. Similarly, the second divided communication line 360 of the communication module 12 and the second divided communication lines 361 to 36n of the plurality of solenoid valve modules 161 to 16n are connected to each other. Further, the third divided communication line 380 of the communication module 12 and the third divided communication lines 381 to 38n of the plurality of solenoid valve modules 161 to 16n are connected to each other.

Based on the signals received from the PLC 52, the control circuit 14 of the communication module 12 transmits signals for controlling the solenoid valve 18 of the solenoid valve module to be controlled, to the first to third communication lines 34, 36, and 38 of the communication module 12. The signal transmitted from the control circuit 14 to the first communication line 34 is a clock signal for synchronization. The signal transmitted from the control circuit 14 to the second communication line 36 is a signal (selection signal) for selecting the solenoid valve module to be controlled. The signal transmitted from the control circuit 14 to the third communication line 38 is a signal (solenoid valve control signal) related to control data of the solenoid valve 18.

The solenoid valve control circuit 20 of each of the solenoid valve modules 161 to 16n includes a first communication circuit 22. The first divided communication lines 341 to 34n of the respective solenoid valve modules 161 to 16n are branched in the middle and connected to the first communication circuits 22. As a result, the first communication circuit 22 of each of the solenoid valve modules 161 to 16n can receive the clock signal via the first communication line 34. The second divided communication lines 361 to 36n of the respective solenoid valve modules 161 to 16n are branched in the middle and connected to the first communication circuits 22. As a result, the first communication circuit 22 of each of the solenoid valve modules 161 to 16n can receive the selection signal via the second communication line 36.

The first communication circuit 22 is inserted in the middle of the third divided communication lines 381 to 38n of the respective solenoid valve modules 161 to 16n. As a result, the first communication circuit 22 of each of the solenoid valve modules 161 to 16n can receive the solenoid valve control signal via the third communication line 38, and transfer the received solenoid valve control signal to the next-stage solenoid valve module via the third communication line 38. The solenoid valve control circuit 20 of the solenoid valve module to be controlled among the solenoid valve modules 161 to 16n outputs a drive signal to the solenoid valve 18 on the basis of the received solenoid valve control signal.

The solenoid valve control circuit 20 of each of the solenoid valve modules 161 to 16n diagnoses an operation state of the solenoid valve 18 of the solenoid valve module. Specifically, the solenoid valve control circuit 20 diagnoses whether the coil of the solenoid valve 18 melts to cause a short circuit, whether the temperature in the solenoid valve module exceeds the upper limit of the allowable temperature, and the like. A signal related to the diagnostic content (diagnostic information) is transmitted from the first communication circuit 22 to the third communication line 38 together with the solenoid valve control signal, and is transmitted to the next-stage solenoid valve module.

The signal transmitted from the first communication circuit 22 of each of the solenoid valve modules 161 to 16n to the third communication line 38 also includes signals related to diagnostic information created in the solenoid valve modules from the start-end solenoid valve module 161 to the previous-stage solenoid valve module. The signal transmitted from the first communication circuit 22 of the terminal solenoid valve module 16n to the third communication line 38 includes signals related to diagnostic information created in all the solenoid valve modules 161 to 16n.

The solenoid valve control device 10 includes a receiving line 40 extending from the control circuit 14 of the communication module 12. The receiving line 40 is a communication line through which the communication module 12 receives a signal from the terminal solenoid valve module 16n. The receiving line 40 is constituted by one communication line, and crosses the communication module 12 and the plurality of solenoid valve modules 161 to 16n.

The receiving line 40 includes a fourth divided communication line 400 disposed in the communication module 12, and fourth divided communication lines 401 to 40n disposed in the solenoid valve modules 161 to 16n. By the plurality of solenoid valve modules 161 to 16n being connected to the communication module 12, the fourth divided communication line 400 of the communication module 12 and the fourth divided communication lines 401 to 40n of the plurality of solenoid valve modules 161 to 16n are connected to each other.

The solenoid valve control circuit 20 of each of the solenoid valve modules 161 to 16n includes a second communication circuit 24 constituted by a general-purpose logic IC. The second communication circuit 24 includes an input terminal 26, an output terminal 28, and an output enable terminal 30. In each of the solenoid valve modules 161 to 16n, the input terminal 26 of the second communication circuit 24 is connected, via a first connection line 48, to corresponding one of the third divided communication lines 381 to 38n each extending from the first communication circuit 22 toward the next-stage solenoid valve module. Further, in each of the solenoid valve modules 161 to 16n, the output terminal 28 of the second communication circuit 24 is connected, via a second connection line 50, to corresponding one of the fourth divided communication lines 401 to 40n constituting the receiving line 40.

The solenoid valve control device 10 includes a switching line 42 extending from the control circuit 14 of the communication module 12. A constant voltage (High signal) is always supplied to the switching line 42. The switching line 42 crosses the communication module 12 and the plurality of solenoid valve modules 161 to 16n.

The switching line 42 includes a divided switching line 420 disposed in the communication module 12, and divided switching lines 421 to 42n disposed in the solenoid valve modules 161 to 16n. By the plurality of solenoid valve modules 161 to 16n being connected to the communication module 12, the divided switching line 420 of the communication module 12 and the divided switching lines 421 to 42n of the plurality of solenoid valve modules 161 to 16n are connected to each other.

Each of the solenoid valve modules 161 to 16n includes a first branch switching line 44 branching from corresponding one of the divided switching lines 421 to 42n, and a second branch switching line 46 extending from the output enable terminal 30 of the second communication circuit 24. By the plurality of solenoid valve modules 161 to 16n being connected to the communication module 12, the end portion of the second branch switching line 46 of each of the solenoid valve modules 161 to 16n is connected to the end portion of the first branch switching line 44 of the next-stage solenoid valve module. However, in the terminal solenoid valve module 16n, since there is no solenoid valve module of the next stage, the end portion of the second branch switching line 46 is open.

Accordingly, the output enable terminals 30 of the second communication circuits 24 of the solenoid valve modules other than the terminal solenoid valve module 16n are connected to the switching line 42. Specifically, the output enable terminal 30 of each of the solenoid valve modules is connected, via the second branch switching line 46 of that solenoid valve module and the first branch switching line 44 of the next-stage solenoid valve module, to the divided switching line of the next-stage solenoid valve module.

On the other hand, the output enable terminal 30 of the second communication circuit 24 of the terminal solenoid valve module 16n is separated from the switching line 42. A High signal is input to the output enable terminal 30 connected to the switching line 42, and a Low signal is input to the output enable terminal 30 separated from the switching line 42.

When a High signal is input to the output enable terminal 30, the second communication circuit 24 sets the output terminal 28 to high impedance regardless of the signal input to the input terminal 26. On the other hand, when a Low signal is input to the output enable terminal 30, the second communication circuit 24 outputs the same signal as the signal input to the input terminal 26, from the output terminal 28. That is, the second communication circuit 24 outputs a Low signal from the output terminal 28 when a Low signal is input to the input terminal 26, and outputs a High signal from the output terminal 28 when a High signal is input to the input terminal 26.

Therefore, in the solenoid valve modules other than the terminal solenoid valve module 16n, the output terminals 28 of the second communication circuits 24 are in a high impedance state. Therefore, the second communication circuits 24 are disconnected from the fourth divided communication lines, and no signal is transmitted to the receiving line 40.

On the other hand, in the terminal solenoid valve module 16n, the signal transmitted from the first communication circuit 22 to the third divided communication line 38n is transmitted to the fourth divided communication line 40n constituting the receiving line 40, via the first connection line 48, the second communication circuit 24, and the second connection line 50. That is, the terminal solenoid valve module 16n transmits the signal, which is transmitted through the third communication line 38, to the communication module 12 through the receiving line 40.

As a result, the solenoid valve control signal and the signals related to the diagnostic information of all the solenoid valve modules 161 to 16n are fed back to the communication module 12, and the communication module 12 can grasp the diagnostic information of the respective solenoid valve modules 161 to 16n. In FIG. 1, the flow of the solenoid valve control signal and the signals related to the diagnostic information are indicated by arrows.

Each of the solenoid valve modules 161 to 16n includes a solenoid valve control circuit power line 47 that branches from corresponding one of the divided switching lines 421 to 42n and reaches the solenoid valve control circuit 20. Electric power necessary for the operation of the solenoid valve control circuit 20 of each of the solenoid valve modules 161 to 16n is supplied from the control system power supply 62 via the control circuit 14 of the communication module 12, the switching line 42, and the solenoid valve control circuit power line 47.

A signal transmission system between the communication module 12 and the plurality of solenoid valve modules 161 to 16n through the transmission line 32 and the receiving line 40 is a system in which serial peripheral interface (SPI) communication is performed in a daisy chain mode. The first communication circuit 22 of each of the solenoid valve modules 161 to 16n is constituted by a communication IC in which SPI communication can be connected in a daisy chain mode.

According to the present embodiment, since the switching line 42 and the second communication circuit 24 are provided, the signals related to the diagnostic information of the plurality of solenoid valve modules 161 to 16n are automatically transmitted from the terminal solenoid valve module 16n to the communication module 12. As a result, the communication module 12 can grasp the diagnostic information of the plurality of solenoid valve modules 161 to the 16n. Further, a communication line for feeding back the diagnostic information of the plurality of solenoid valve modules 161 to the 16n to the communication module 12 is not particularly required. In addition, even if the terminal solenoid valve module is changed by adding a solenoid valve module, the signal transmission path is automatically switched, and therefore, it is not necessary to give a special instruction to the terminal solenoid valve module.

Moreover, transmission of signals between the communication module 12 and the plurality of solenoid valve modules 161 to 16n is performed through the transmission line 32 and the receiving line 40 that cross these modules. As a result, the number of communication lines required to transmit signals between the communication module 12 and the plurality of solenoid valve modules 161 to 16n can be reduced as much as possible. In the present embodiment, the solenoid valve control signal and the signals related to the diagnostic information can be transmitted through a total of four communication lines including the communication lines constituting the transmission line 32 and the communication line constituting the receiving line 40.

The present invention is not limited to the embodiment described above, and various configurations may be adopted therein without deviating from the essence and gist of the present invention.

What is claimed is:

1. A solenoid valve control device comprising a plurality of solenoid valve modules, and a communication module, the solenoid valve modules being connected in series to the communication module,
the solenoid valve control device further comprising: a transmission line; a receiving line; and a switching line, wherein the transmission line, the receiving line, and the switching line cross the communication module and the plurality of solenoid valve modules, the solenoid valve modules each include a first communication circuit and a second communication circuit, an input terminal of the second communication circuit is connected to the transmission line, and an output terminal of the second communication circuit is connected to the receiving line,
wherein a solenoid valve control signal transmitted from the communication module to the transmission line is received by the first communication circuit of each of the solenoid valve modules, and a signal related to diagnostic information is transmitted from the first communication circuit to the transmission line together with the solenoid valve control signal, and
wherein the second communication circuit of each of the solenoid valve modules other than the solenoid valve module disposed at a terminal end of the plurality of solenoid valve modules receives a signal from the switching line located in the solenoid valve module disposed next thereto, and the second communication circuit of the solenoid valve module that is disposed at the terminal end and that receives no signal from the switching line transmits the solenoid valve control signal and signals related to the diagnostic information of the plurality of solenoid valve modules to the communication module via the receiving line.

2. The solenoid valve control device according to claim 1, wherein
the second communication circuit includes an output enable terminal, and the output enable terminal of the second communication circuit of each of the solenoid valve modules other than the solenoid valve module disposed at the terminal end is connected to the switching line.

3. The solenoid valve control device according to claim 2, wherein
the solenoid valve modules each include a first branch switching line branching from the switching line, and a second branch switching line extending from the output enable terminal of the second communication circuit, and an end portion of the second branch switching line of each of the solenoid valve modules other than the solenoid valve module disposed at the terminal end is connected to an end portion of the first branch switching line of the solenoid valve module disposed next thereto.

4. The solenoid valve control device according to claim 1, wherein
the transmission line includes a first communication line configured to transmit a clock signal, a second communication line configured to transmit a selection signal, and a third communication line configured to transmit the solenoid valve control signal and the signal related to the diagnostic information.

5. The solenoid valve control device according to claim 1, wherein
the solenoid valve modules each include a solenoid valve control circuit, and a solenoid valve control circuit power line branching from the switching line and reaching the solenoid valve control circuit.

* * * * *